United States Patent [19]

Inagaki et al.

[11] Patent Number: 4,863,988
[45] Date of Patent: Sep. 5, 1989

[54] COMPOSITION FOR CURABLE PAINTS

[75] Inventors: Hajime Inagaki, Iwakuni; Tadao Saitoh, Ohtake, both of Japan

[73] Assignee: Mitsui Petrochemical Industries, Ltd., Tokyo, Japan

[21] Appl. No.: 257,147

[22] Filed: Oct. 13, 1988

Related U.S. Application Data

[63] Continuation of Ser. No. 26,851, Mar. 17, 1989, abandoned.

[30] Foreign Application Priority Data

Mar. 18, 1986 [JP] Japan ................................. 61-58026

[51] Int. Cl.$^4$ ...................... C08L 33/08; C08L 63/02; C08L 67/06; C08L 75/02; C08L 75/04
[52] U.S. Cl. .................................. 524/315; 524/365; 524/391; 524/504; 525/64; 525/65; 525/66; 525/68; 525/78
[58] Field of Search ................. 525/64, 65, 66, 68, 525/78; 524/315, 365, 391, 504

[56] References Cited

U.S. PATENT DOCUMENTS 3,579,485   5/1971   Folzenlogen ...................... 525/285

FOREIGN PATENT DOCUMENTS 58-185655   10/1983   Japan ....................................... 525/66
59-166534   9/1984    Japan .
61-095076   5/1986    Japan ....................................... 525/66

Primary Examiner—Patricia Short
Attorney, Agent, or Firm—Sherman and Shalloway

[57] ABSTRACT

A composition for curable paints, comprising
(A) 100 parts by weight of a resin for curable paints, and
(B) 0.5 to 10 parts by weight of chlorinated and graft-modified polypropylene which is produced by chlorinating polypropylene graft-modified with a grafting component selected from the group consisting of alpha,beta-unsaturated dicarboxylic acids, anhydrides thereof and esters thereof, and which has a chlorine content of 5 to 50% by weight, said graft-modified polypropylene having a degree of saponification of 5 to 150 mg/g and an intrinsic viscosity [$\eta$] of 0.1 to 5 dl/g. A curable paint comprising the composition and a diluent.

9 Claims, No Drawings

COMPOSITION FOR CURABLE PAINTS

This application is a continuation, application Ser. No. 026,851 filed Mar. 17, 1987, now abandoned.

This invention relates to a composition for curable paints, and to a paint comprising the composition. More specifically, this invention relates to a composition for curable paints and a paint which can form a coated film having excellent water resistance and adhesion without a primar coating when coated on the surface of a plastic article made from a thermoplastic resin such as polyolefins, polyamides and polyesters or a thermosetting resin such as unsaturated polyesters and phenolic resins, and on the surface of an article vapor-deposited or bonded with a metal or an inorganic substance.

Many attempts have been made to use synthetic resins in place of metals for weight reduction or otherwise in various industrial fields notably in the automobile and household electric appliance industries. In such applications, the surface of a plastic article is usually coated and therefore good coatability is required. However, a coating applied to the surface of a plastic article made of, for example, a thermoplastic resin such as polyolefins, polyamides and polyesters or a thermosetting resin such as unsaturated polyesters and phenolic resins or to the surface of an article vapor-deposited or bonded with a metal or inorganic substance generally has poor adhesion and water resistance, and it has been difficult to form an excellent coated film on such a surface.

To improve coatability on the surface of a plastic article, particularly a polyolefin article, it was proposed to pretreat the surface of the article. This method, however, cannot fully improve film properties such as adhesion.

Japanese Patent Publication No. 10916/1975 (corresponding to U.S. Pat. No. 3,579,485) discloses a method for producing a chlorinated carboxyl-containing poly(alpha-olefin) which comprises reacting a poly(alpha-olefin) having a melt viscosity at 190° C. to about 100 to 5,000 cp and a logarithmic viscosity, determined in tetralin at 145° C., of about 0.1 to 0.5 with an unsaturated carboxylic acid to form a carboxy-containing poly(alpha-olefin), and thereafter chlorinating the polyolefin. It states that as a primer, a chlorinated carboxyl-containing poly(alpha-olefin) having a chlorine content of about 10 to 30% by weight is used, and as a coating, a chlorinated carboxyl-containing poly(alpha-olefin) having a chlorine content of about 60 to 70% by weight is used.

U.S. patent application Ser. No. 922,785 filed on 10/23/86, now U.S. Pat. No. 4,755,553, and the corresponding European Laid-Open Patent Application No. 148346 filed by the present inventors disclose a primer composition comprising (i) 1 to 100 parts by weight of a post-chlorination product of a graft-modified propylene polymer having a chlorine content of 10 to 35% by weight which has an acid value of 6 to 187 mg-KOH/g-polymer and is obtained by grafting an unsaturated dicarboxylic acid anhydride to a propylene polymer having an intrinsic viscosity [η], determined at 135° C. in decalin, of 0.6 to 10 dl/g and comprising 70 to 100 mole% of propylene and 0 to 30 mole% of an alpha-olefin other than propylene, and (ii) 100 parts by weight of an organic solvent boiling at about 60° C. to about 200° C.

Some type of the modified polyolefin, as a primer, may have excellent adhesion to such a plastic article. However, uniform coating of a primer is difficult and the primer coating requires much time and labor. This will also lead to a marked increase in the cost of coating. Accordingly, the primer coating is not suitable for industrial practice.

Japanese Patent Publication No. 47487/1977 and Japanese Laid-Open Patent Publication No. 139142/1977 propose a coating composition comprising an epoxy resin, a curing agent for an epoxy resin and a polyolefin or ethylene copolymer having a functional group capable of reacting with the epoxy group, which gives a coated film having improved adhesion on a plastic article made from, for example, a thermoplastic resin such as polyolefins or polyesters or a thermosetting resin such as unsaturated polyesters or phenolic resins and a plastic article vapor-deposited or bonded with a metal or an inorganic substance on the surface of the plastic article. These patent documents specifically describe maleic anhydride-modified polypropylene, ethylene/acrylic acid copolymer, ethylene/vinyl acetate copolymer and ethylene/acrylic acid/vinyl acetate copolymer as examples of the polyolefin or ethylene copolymer having a functional group reactive with the epoxy group. As is clear from Examples given there, coated films obtained by coating the coating compositions on a metal surface have excellent adhesion to the surface of the metal. However, when a polyolefin is hot-melt bonded to such a coated film or a solution of the above coating composition is coated on the surface of a polyolefin article, the adhesion between the coated film and the surface of the polyolefin is not good and no sufficient film performance can be obtained.

Japanese Laid-Open Patent Publication No. 161416/1981 describes a technique of using a chlorinated polyolefin modified with an acrylic acid-type monomer as a film-forming adhesive. This modified polyolefin, however, generally contains much gel and an article to which this adhesive is applied has a poor appearance. Moreover, the production of this modified product itself is difficult because of the occurrence of vigorous dehydrochlorination reaction.

Japanese Laid-Open Patent Publication No. 42794/1976 discloses a process for producing a chlorinated product of a graft polyolefin, which comprises grafting a monomer having one ethylenically unsaturated bond and at least one carboxyl group per molecule to a polyolefin and chlorinating the resulting graft polyolefin having an acid value of 5 to 150 to a chlorine content of 10 to 75% by weight. It describes that the above chlorinated product is used as a paint. However, the chlorinated monocarboxylic acid-grafted polyethylene disclosed in the working examples of this patent document has poor reactivity with a curable paint. Hence, an article coated with it has poor gasoline resistance. Furthermore, since the baking temperature should be made high, deformation is liable to occur in the coated article.

Japanese Laid-Open Patent Publication No. 75958/1984 discloses a coating composition for polypropylene comprising as main constituents (I) a chlorinated polyolefin resulting from chlorination of a polyolefin having a degree of saponification of 6 to 60 modified with at least one compound selected from the group consisting of unsaturated polycarboxylic acids and acid anhydrides thereof, and (II) a compound or resin having at least two epoxy groups per molecule. It states that the composition comprises 100 parts of the chlorinated polyolefin (I) and 0.5 to 50 parts by weight of the compound of resin (II) having epoxy groups, and if the proportion of the compound or resin (II) is less than 0.5 part by weight, the resulting resin does not have sufficient solvent resistance, and if it exceeds 50 parts by weight, the adhesion of the composition to a sheet or another article of a polypropylene is reduced.

Japanese Patent Publication No. 166534/1984 discloses a coating agent suitable for application to polyolefins, comprising a chlorinated product of a maleic anhydride-added propylene polymer having a low molecular weight, the propylene polymer before addition of maleic anhydride having an average molecular weight of 2,000 to 30,000. It states that a chlorinated product of maleic acid-grafted polypropylene is obtained by modifying polypropylene having a high molecular weight, and when it is used together with, or mixed with, an epoxy resin, a urethane resin, an acrylic resin or an alkyd resin, the compatibility between the two is poor, and a uniform mixture is difficult to form.

It is an object oof this invention to provide a novel resin composition for curable paints.

Another object of this invention is to provide a composition for curable paints which gives a coated film having excellent adhesion to the surface of a plastic article made from, for example, a thermoplastic resin such as polyolefins and polyesters or a thermosetting resin such as unsaturated polyesters and phenolic resins and on the surface of a plastic article vacuum-deposited or bonded with a metal or an inorganic substance.

Still another object of this invention is to provide a coating composition which can obviate a primer treatment on the surface of a plastic article to be coated, and therefore lead to a marked improvement in coating operability and workability, a drastic shortening of the overall time required for coating and to a significant reduction in the cost of coating.

Yet another object of this invention is to provide a coating composition which gives a coated film having excellent adhesion to a substrate surface and better properties, such as higher surface hardness and water resistance, than conventional coated films.

A further object of this invention is to provide a paint comprising the composition of the invention.

Additional objects and advantages of this invention will become apparent from the following description.

The above objects and advantages of the invention are achieved by a composition for curable paints, comprising (A) 100 parts by weight of a resin for curable paints, and (B) 0.5 to 10 parts by weight of chlorinated and graft-modified polypropylene which is produced by chlorinating polypropylene graft-modified with a grafting component selected from the group consisting of alpha,beta-unsaturated dicarboxylic acids, anhydrides thereof and esters thereof, and which has a chlorine content of 5 to 50% by weight, said graft-modified polypropylene having a degree of saponification of 5 to 150 mg/g and an intrinsic viscosity $[\eta]$ of 0.1 to 5 dl/g.

The resin (A) for curable paints is a resin film-forming element which can form a cured coated film by various reactions such as polycondensation, polymerization, addition reaction and crosslinking reaction after it is coated as a paint.

Specific examples of the resin (A) include resins for condensation-type paints such as alkyd resins or modification products thereof, unsaturated polyesters or modification products thereof, phenolic resins, epoxy resins and modification products thereof, urea resins, amino resins such as melamine resins, polyurethanes and drying oils; and resins for polymerization-type paints such as acrylic resins and rubber-type paint resins. Among these, resins for condensation-type paints and acrylic resins are preferred. Urethane resins, alkyd resins, polyester resins, epoxy resins and phthalic acid resins are especially preferred.

The component (A) of the composition of this invention may contain a monomer component, an oligomer component, a prepolymer component, a polycondensate component and a crosslinkable component which form cured coated films by curing reaction, or mixtures of at least two of these components in addition to the resin for curable paints.

The chlorinated and graft-modified polypropylene (B) is produced by chlorinating polypropylene graft-modified with a grafting component selected from the group consisting of alpha,beta-unsaturated dicarboxylic acids, anhydrides and esters thereof.

The polypropylene before grafting and chlorination is preferably a polymer containing 70 to 100 mole%, especially 85 to 100 mole%, of propylene component units, or in other words, a homopolymer or copolymer of propylene containing preferably 0 to 30 mole%, more preferably 0 to 15 mole%, of units of an alpha-olefin component other than propylene.

Examples of the other alpha-olefin include ethylene, 1-butene, 1-pentene, 1-hexene, 2-methyl-1-butene, 3-methyl-1-pentene, 4-methyl-1-pentene, 1-heptene and 1-octene. Of these other alpha-olefins, ethylene and 1-butene are preferred. The copolymer containing the alpha-olefin units may contain units of at least one alpha-olefin. The propylene polymer before grafting and chlorinating may contain copolymerizable monomers such as acrylic acid, acrylic esters, vinyl acetate, vinyl alcohol and vinyl chloride in addition to the above components. The proportion of such copolymerizable monomers is up to 30 mole% based on the entire copolymer.

The propylene polymers may be random copolymers and block copolymers comprising these constituent units. Examles of preferred propylene polymers are isotactic polypropylene, propylene/ethylene copolymer, propylene/1-butene copolymer and propylene/4-methyl-1-pentene copolymer.

The graft-modified polypropylene is obtained by grafting a grafting component selected from the group consisting of alpha,beta-unsaturated dicarboxylic acids, anhydrides thereof and esters thereof to the aforesaid propylene polymer. The alpha, beta-unsaturated dicasrboxylic acids and anhydrides thereof are preferred.

Examples of suitable, alpha,beta-unsaturated dicarboxylic acids or anhydrides thereof are maleic acid, maleic anhydride, citraconic acid, citraconic anhydride and fumaric acid. Of these, maleic acid and maleic anhydride are especially suitable. The esters of alpha,beta-unsaturated dicarboxylic acids are mono-lower alkyl esters and di-lower alkyl esters of these alpha,beta-unsaturated dicarboxylic acids. Examples of the lower alkyl group are alkyl groups of 1 to 3 carbon atoms such as methyl, ethyl, propyl and isopropyl groups. Mono-lower alkyl esters of maleic acid are especially suitable.

Grafting of the grafting component to the propylene polymer may be effected by known methods, for example the one disclosed in Japanese Laid-Open Patent Publication No. 185656/1983.

The chlorinated and graft-modified polypropylene (B) used for this invention is obtained by chlorinating the above graft-modified polypropylene. Chlorination can be carried out in a homogeneous solvent solution resulting from complete dissolution of the graft-modified polypropylene in a solvent. Examples of the solvent include aliphatic hydrocarbons such as hexane, heptane, octane, decane, dodecane, tetradecane and kerosene; alicyclic hydrocarbons such as methylcyclopentane, cyclohexane, methyldichlorohexane, cyclooctane and cyclododecane; aromatic hydrocarbons such as benzene, toluene, xylene, ethylbenzene, cumene, ethyltoluene, trimethylbenzene, cymene and diisopropylbenzene; and halogenated hydrocarbons such as chlorobenzene, bromobenzene, o-dichlorobenzene, carbon tetrachloride, carbon tetrabromide, chloroform, bromoform, trichloroethane, trichloroethylene, tetrachloroethane and tetrachloroethylene. Of these, halogenated hydrocarbons are especially suitable.

While a homogeneous solution of the graft-modified polypropylene in such a solvent is exemplified above is well stirred, chlorine gas is added and reacted with the polymer until a predetermined chlorine content is reached. To carry out the chlorination reaction efficiently, it is possible to use a radical generator, or to irradiate ultraviolet light or visible light. This radical generator may be the same as radical generators used in graft-modifying the propylene polymer. There can also be used a method of obtaining the chlorinated product without the addition of the radical generator or the irradiation of ultraviolet light or visible light. The temperature at which the chlorination reaction is carried out is usually about 50° to 120° C., and the reaction time is about 0.5 to 5 hours.

The above chlorination method gives a chlorinated and graft-modified polypropylene having a chlorine content of 5 to 50% by weight, preferably 10 to 40% by weight. If the chlorine content is less than 5% by weight, the resulting chlorinated product has insufficient solubility in solvent and poor compatibility with a base paint. A uniform coating composition, therefore, is difficult to obtain from the chlorination product having such a low chlorine content.

When the chlorine content exceeds 50% by weight, a coated film has reduced gasoline resistance after curing. If the chlorine content of the chlorinated product is too high, the cost of production increases. A further defect is that a coated film has reduced adhesion to the plastic article.

The chlorine content of the chlorinated product can be determined, for example, by completely burning about 10 mg of the chlorinated product in an oxygen flask, absorbing the chlorine portion as hydrogen chloride in water, adding $AgNO_3$ to the aqueous hydrogen chloride solution, recovering the precipitated silver chloride, and determining the chlorine content (% by weight) of the chlorinated product from the fluorescent X-ray spectrum of silver chloride.

Investigations of the present inventors have shown that the graft-modified polypropylene used in this invention before chlorination advantageously has a degree of saponification of 5 to 150 mg/g, preferably 7 to 100 mg/g. If the degree of saponification is lower than 5 mg/g, the adhesion strength, gasoline resistance and surface hardness of the resulting coated film are reduced. If it exceeds 150 mg/g, the water-resistance of the coated film is reduced.

Likewise, the graft-modified polypropylene used in this invention before chlorination advantageously has an intrinsic viscosity $[\eta]$ of 0.1 to 5 dl/g, preferably 0.2 to 3 dl/g. If the intrinsic viscosity is higher than 5 dl/g or lower than 0.1 dl/g, the adhesion of the resulting coated film is reduced. In addition, when it is less than 0.1 dl/g, the cohesive force of the coating composition is reduced. If it is higher than 5 dl/g, the compatibility of the resulting composition with a base paint becomes poor.

The intrinsic viscosity $[\eta]$ is measured in a decalin solution at 135° C.

The composition of this invention for curable paints comprises 100 parts by weight of the resin (A) and 0.5 to 10 parts by weight of the chlorinated and graft-modified polypropylene (B). Preferably, the composition comprises 100 parts by weight of the resin (A) and 1 to 10 parts by weight of the chlorinated and graft-modified polypropylene (B). If the proportion of the chlorinated and graft-modified polypropylene (B) is less than 0.5 part by weight, the adhesion of a coated film prepared from the resulting composition becomes poor.

The composition of this invention is diluted with a diluent such as a solvent or water and used as a paint. The paint may, for example, be a solvent-base paint or an emulsion paint.

The solvent-base paint may be prepared by dissolving the chlorinated and graft-modified polypropylene (B) in a solution (paint) of the resin (A) in a solvent. Desirably, the solution of the chlorinated and graft-modified polypropylene (B) is mixed with the solution of the resin (A) or paint. In this case, the solvent which may be identical with, or different from, the solvent dissolving the resin (A).

Examples of the solvent for the chlorinated and graft-modified polypropylene (B) include aromatic hydrocarbons such as benzene, toluene and xylene; aliphatic hydrocarbons such as hexane, heptane, octane and decane; halogenated hydrocarbons such as trichloroethylene, perchloroethylene, dichloroethylene, dichloroethane, chlorobenzene and dichlorobenzene; alcohols such as methanol, ethanol, isopropanol and butanol; ketones such as acetone, methyl ethyl ketone and methyl isobutyl ketone; and esters such as methyl acetate, ethyl acetate, isopropyl acetate and butyl acetate. These solvents may be used singly or in combination.

The emulsion paint may be prepared by adding an aqueous emulsion of the chlorinated and graft modified polypropylene (B) to an emulsion (paint) of the resin (A). Emulsification may be carried out by a known technique, and the above emulsion may be prepared by the known emulsification technique using a surfactant.

The paint of this invention may further comprise a pigment, a solvent (in the case of a solvent-base paint), a dispersion medium (in the case of an emulsion paint), a levelling agent, a weatherability stabilizer, a heat stabilizer, etc. in addition to the above essential components.

The paint of this invention is suitably used for coating the surface of a plastic article made from, for example, a thermoplastic resin such as polyolefins and polyesters or a thermosetting resins such as phenolic resins and unsaturated polyesters or the surface of a plastic article vapor-deposited or bonded with a metal or an inorganic substance. It may also be used for coating the surface of another substrate such as metal, inorganic material, wood or paper. Specific examples of the thermoplastic resin constituting the substrate of the article include polyolefins such as homopolymers of alpha-olefins and copolymers composed of alpha-olefins as a main component; polyacrylates; polycarbonates; polyester resins such as polyethylene terephthalate and polybutylene terephthalate; polyvinyl chloride; polystyrene; polytetrafluoroethylene; polyoxymethylene; polyamides; styrene/butadiene/acrylonitrile copolymer; polysulfone; polyphenylene oxide; modified polyphenylene oxide; polyphenylene sulfide; and polyether sulfone; and mixtures of these. Specific examples of the thermosetting resin are unsaturated polyester resins, epoxy resins, phenolic resins, malamine resins, diallyl phthalate resins, polyallyl glycol carbonate resins, urea resins and mixtures of these.

These synthetic resins may include fillers such as talc, barium sulfate, calcium carbonate, mica and silica. They may be reinforced with carbon fibers, glass fibers, silicon carbide fibers and aramid fibers.

Examples of the metal or inorganic substance to be vapor-deposited or bonded to the surface of such a plastic article include metals having nickel, chromium, copper, aluminum, iron, tin, cobalt, etc. as a component, and materials containing $SiO_2$, $ZiO_2$, $Al_2O_3$, $TiO_2$, etc. as a main component.

For example, when the paint of this invention is applied to articles made from thermoplastic resins or thermosetting resins, the resulting coated films have much improved adhesion. It is especially preferred that the paint of the invention be applied to polyolefin articles. Preferred additives for these synthetic resins are talc, calcium carbonate, glass fibers and aramid fibers. Nickel, chromum with $SiO_2$ are preferred as materials to be vapor-deposited or bonded onto the plastic article because they do not reduce the adhesion of the resulting coated film.

Specific examples of the polyolefins include homopolymers of alpha-olefins such as ethylene, propylene, 1-butene, 1-hexene, 4-methyl-1-pentene, 1-octene and 1-decene, copolymers of at least two alpha-olefins, and copolymers of a major proportion of the alpha-olefin with a minor proportion (for examle, not more than 30 mole%) of another component, for example, vinyl esters of lower aliphatic carboxylic acids such as vinyl acetate and vinyl propionate, and esters or metal salts of acrylic carboxylic acids such as methyl acrylate, metal salts of acylic acid, methyl methacrylate and metal salts of methacrylic acid. It is especially preferred to apply the paint of this invention to articles of crystalline polyolefins, particularly crystalline propylene polymers composed of propylene units as a main component.

The following examples specifically illustrate the present invention.

Coated test specimens used in these examples were prepared by the following method, and various properties such as adhesion, water resistance and surface hardness in the following examples were measured or determined by the following methods.

Method of preparing a coated test specimen

A substrate (plate-like) was degreased and coated with a paint at room temperature by an air spray method. The coated film was dried by standing at room temperature for about 5 minutes, and baked at 120° C. for 20 minutes in an air oven.

Methods of evaluating various properties (1) Degree of saponificaion

About 0.5 g of a sample was accurately weighed into a flask, and 50 cc of p-xylene and 150 cc of dimethyl sulfoxide were added. The mixture was heated to form a solution, and then 25 cc of N/2 potassium hydroxide was added. The solution was heated at 135° C. for 1 hour after attaching a reflux condenser to the flask. Thereafter, the mixture was cooled to room temperature and back-tritrated with a N/2 hydrochloric acid standard solution using phenolphthalein as an indicator. A blank test was also conducted. The degree of saponification was calculated in accordance with the following formula.

$$\text{Degree of saponification} = \frac{28.055 \times (A - B) \times F}{C}$$

A: the amount (cc) of hydrochloric acid in the blank test
B: the amount (cc) of hydrochloric acid used in the main test
C: the amount (g) of the sample taken
F: the factor of hydrochloric acid (2) Adhesion The adhesion was measured by a cross hatch test in accordance with JIS K-5400-1979. Each side of one square formed by crosshatching measured 1 mm. The result is expressed by the number of squares remaining adhered to the substrate out of 100 squares.

(3) Water resistance

The test specimen was immersed for 240 hours in pure water at 40° C. Changes in the appearance of the coated film layer were visually observed, and its adhesion was evaluated.

(4) Gasoline resistance

The coated specimen was immersed for 24 hours in regular gasoline, and changes in appearance were observed visually. The results was evaluated on the following standard.

○: Blisters and peeling of the coated film were not observed.
Δ: Slight blisters were observed in the coated film.
X: Marked blisters and peeling were observed in the coated film.

(5) Initial compatibility

The paint as prepared was left to stand at room temperature for 3 hours, and the state of the paint was visually observed and evaluated on the following standards.

○: Uniform without phase separation or formation of a gel-like material.
Δ: Slight phase separation occured.
X: Phase separation occurred and a gel-like material was seen to form.

(6) Long-term compatibility

The paint prepared was left to stand at room temperature for 1 month, and the state of the paint was observed visually and evaluated on the same standard as in the initial compatibility (5).

(7) Surface gloss

Measured by the 60° specular gloss described in JIS K-5400-1979.

EXAMPLES 1-19 AND COMPARATIVE EXAMPLES 1-13

In each run, a toluene solution of the chlorinated modified propylene polymer indicated in Table 1 was mixed with a curable paint by using a homodisper. The resulting paint was spray-coated on each of the substrates obtained and degreased by the methods indicated in Table 1. The properties of the paint and the coated film were measured, and the results are shown in Table 1.

TABLE 1

| Example (Ex.) or Comparative Example (CEx.) | Ex. 1 | Ex. 2 | CEx. 1 | CEx. 2 | Ex. 3 | Ex. 4 | CEx. 3 | Ex. 5 |
|---|---|---|---|---|---|---|---|---|
| **Chlorinated and graft-modified polypropylene (*1)** | | | | | | | | |
| Propylene content (mole %) | 100 | 100 | 100 | 100 | 100 | 100 | 100 | 100 |
| Alpha-olefin component | — | — | — | — | — | — | — | — |
| Content (mole %) of the alpha-olefin component | — | — | — | — | — | — | — | — |
| Grafting component | Maleic anhydride | Maleic anhydride | Maleic anhydride | Maleic anhydride | Maleic anhydride | Maleic anhydride | Maleic anhydride | Maleic anhydride |
| Degree of saponification (mg/g) | 33.5 | 33.5 | 33.5 | 33.5 | 50 | 50 | 50 | 50 |
| Intrinsic viscosity [η] (dl/g) | 0.40 | 0.40 | 0.40 | 0.40 | 0.35 | 0.35 | 0.35 | 0.35 |
| Chlorine content (wt. %) | 30 | 30 | 30 | 30 | 15 | 40 | 2.5 | 10 |
| Curable paint | Polyurethane-type (*2) | Polyurethane-type (*2) | Polyurethane-type (*2) | Polyurethane-type (*2) | Polyurethane-type (*3) | Polyurethane-type (*3) | Polyurethane-type (*3) | Polyurethane-type (*3) |
| Coating composition | | | | | | | | |
| Chlorinated and graft-modified polypropylene (parts by weight) | 2 | 9 | 0.3 | 15 | 7.5 | 7.5 | 7.5 | 7.5 |
| Resin for curable paint (parts by weight) | 100 | 100 | 100 | 100 | 100 | 100 | 100 | 100 |
| Substrate | | | | | | | | |
| Type | Polypropylene (Polypro, J640) | Polypropylene (Polypro, J640) | Polypropylene (Polypro, J640) | Polypropylene (Polypro, J640) | Polypropylene (Polypro, J640) | Polypropylene (Polypro, J640) | Polypropylene (Polypro, J640) | Polypropylene (Polypro, J640) |
| Method of molding | Injection | Injection | Injection | Injection | Injection | Injection | Injection | Injection |
| Method of degreasing | Washing with a vapor of 1,1,1-trichloroethane | Washing with a vapor of 1,1,1-trichloroethane | Washing with a vapor of 1,1,1-trichloroethane | Washing with a vapor of 1,1,1-trichloroethane | Wiping with white gasoline | Wiping with white gasoline | Wiping with white gasoline | Wiping with white gasoline |
| Properties | | | | | | | | |
| Surface gloss (%) | 94 | 93 | 94 | 85 | 92 | 93 | 52 | 91 |
| Initial compatibility | | | | Δ | | | X | |
| Long-term compatibility | | | | X | | | X | |
| Adhesion | 100/100 | 100/100 | 21/100 | 100/100 | 100/100 | 100/100 | — | 100/100 |
| Water resistance | 100/100 | 100/100 | 0/100 | 100/100 | 100/100 | 100/100 | — | 100/100 |
| Gasoline resistance | | | | Δ | | | | |

| Example (Ex.) or Comparative Example (CEx.) | CEx. 4 | CEx. 5 | Ex. 6 | Ex. 7 | CEx. 6 | CEx. 7 | Ex. 8 | Ex. 9 |
|---|---|---|---|---|---|---|---|---|
| **Chlorinated and graft-modified polypropylene (*1)** | | | | | | | | |
| Propylene content (mole %) | 100 | 100 | 100 | 100 | 100 | 100 | 95 | 95 |
| Alpha-olefin component | — | — | — | — | — | — | Ethylene | Ethylene |
| Content (mole %) of the alpha-olefin component | — | — | — | — | — | — | 5 | 5 |
| Grafting component | Maleic anhydride | Maleic anhydride | Maleic anhydride | Maleic anhydride | Maleic anhydride | Maleic anhydride | Maleic anhydride | Maleic anhydride |
| Degree of saponification (mg/g) | 50 | 50 | 15 | 90 | 2 | 170 | 11.2 | 107.5 |
| Intrinsic viscosity [η] (dl/g) | 0.35 | 0.35 | 0.97 | 0.2 | 1.34 | 0.05 | 1.02 | 3 |
| Chlorine content (wt. %) | 15 | 60 | 30 | 30 | 30 | 30 | 25 | 39 |

TABLE 1-continued

| | CEx. 8 | Ex. 10 | Ex. 11 | Ex. 12 | CEx. 9 | CEx. 10 | CEx. 11 | Ex. 13 |
|---|---|---|---|---|---|---|---|---|
| Curable paint Coating composition | | | | | | | | |
| Chlorinated and graft-modified polypropylene (parts by weight) | EVA(*4) 7.5 | Polyurethane-type(*3) 7.5 | Polyurethane-type(*2) 5 | Polyurethane-type(*2) 5 | Polyurethane-type(*2) 5 | Polyurethane-type(*2) 5 | Polyurethane-type(*2) 5 | Polyurethane-type(*2) 5 |
| Resin for curable paint (parts by weight) | 100 | 100 | 100 | 100 | 100 | 100 | 100 | 100 |
| Substrate | | | | | | | | |
| Type | Polypropylene (Polypro, J440) | Polypropylene (Polypro, J440) | Polypropylene (Polypro, J640) | Polypropylene (Polypro, J640) | Polypropylene (Polypro, J640) | Polypropylene (Polypro, J640) | Polypropylene (Polypro, J640) | Polypropylene (Polypro, J640) |
| Method of molding | Injection | Injection | Injection | Injection | Injection | Injection | Injection | Injection |
| Method of degreasing | Wiping with white gasoline | Wiping with white gasoline | Wiping with white gasoline | Wiping with white gasoline | Wiping with white gasoline | Wiping with white gasoline | Wiping with white gasoline | Wiping with white gasoline |
| Properties | | | | | | | | |
| Surface gloss (%) | 92 | 91 | 96 | 91 | 81 | 81 | 97 | 93 |
| Initial compatibility | | | | | Δ | Δ | | |
| Long-term compatibility | | | | | | | | |
| Adhesion | 100/100 | 85/100 | 100/100 | 100/100 | 29/100 | 29/100 | 100/100 | 100/100 |
| Water resistance | 87/100 | 64/100 | 100/100 | 100/100 | 0/100 | 0/100 | 100/100 | 100/100 |
| Gasoline resistance | X | X | | | X | | | |

| Example (Ex.) or Comparative Example (CEx.) | CEx. 8 | Ex. 10 | Ex. 11 | Ex. 12 | CEx. 9 | CEx. 10 | CEx. 11 | Ex. 13 |
|---|---|---|---|---|---|---|---|---|
| **Chlorinated and graft-modified polypropylene (*1)** | | | | | | | | |
| Propylene content (mole %) | 95 | 95 | 95 | 95 | 95 | 95 | 95 | 95 |
| Alpha-olefin component | Ethylene | Ethylene | Ethylene | Ethylene | Ethylene | Ethylene | Ethylene | Ethylene |
| Content (mole %) of the alpha-olefin component | 5 | 5 | 5 | 5 | 5 | 5 | 5 | 5 |
| Grafting component | Maleic anhydride | Maleic anhydride | Maleic anhydride | Maleic anhydride | Maleic anhydride | Maleic anhydride | Maleic anhydride | Maleic anhydride |
| Degree of saponification (mg/g) | 98 | 11.2 | 11.2 | 11.2 | 25.0 | 25.0 | 11.2 | 11.2 |
| Intrinsic viscosity [η] (dl/g) | 7 | 1.02 | 1.02 | 1.02 | 0.08 | 0.26 | 1.02 | 1.02 |
| Chlorine content (wt. %) | 39 | 25 | 25 | 25 | 25 | 25 | 25 | 25 |
| Curable paint Coating composition | | | | | | | | |
| Chlorinated and graft-modified polypropylene (parts by weight) | Polyurethane-type(*2) 5 | Polyurethane-type(*2) 5 | Polyurethane-type(*2) 5 | Polyurethane-type(*2) 5 | Epoxy-type(*5) 5 | Epoxy-type(*5) 165 | Epoxy-type(*5) 100 | Epoxy-type(*5) 5 |
| Resin for curable paint (parts by weight) | 100 | 100 | 100 | 100 | 100 | 100 | 16 | 100 |
| Substrate | | | | | | | | |
| Type | Sheet molding compound | RIM urethane | MX004 (TPX 004, poly-4-methyl-pentene) | Polypropylene (Polypro, J640) | Polypropylene (Polypro, J640) | Polypropylene (Polypro, J640) | Polypropylene (Polypro, J640) | Polyester (Rynite, Dupont) |
| Method of molding | Pressing | Injection | Injection | Injection | Injection | Injection | Injection | Injection |

TABLE 1-continued

| Method of degreasing | Wiping with isopropanol | Washing with a vapor of 1,1,1-trichloroethane | Wiping with isopropanol | Wiping with white gasoline | Wiping with white gasoline | Wiping with white gasoline | Wiping with white gasoline | Wiping with isopropanol |
|---|---|---|---|---|---|---|---|---|
| Properties | | | | | | | | |
| Surface gloss (%) | 35 | 93 | 91 | 94 | 95 | 94 | 93 | 93 |
| Initial compatibility | X | | | | | | | |
| Long-term compatibility | X | | | | | | | |
| Adhesion | — | 100/100 | 100/100 | 100/100 | 70/100 | 100/100 | 100/100 | 100/100 |
| Water resistance | — | 100/100 | 100/100 | 100/100 | 47/100 | 99/100 | 85/100 | 100/100 |
| Gasoline resistance | | | | | X | Δ | X | X |

| Example (Ex.) or Comparative Example (CEx.) | Ex. 14 | Ex. 15 | Ex. 16 | Ex. 17 | Ex. 18 | CEx. 12 | Ex. 19 | CEx. 13 |
|---|---|---|---|---|---|---|---|---|
| **Chlorinated and graft-modified polypropylene (*1)** | | | | | | | | |
| Propylene content (mole %) | 100 | 100 | 100 | 100 | 100 | 100 | 100 | 100 |
| Alpha-olefin component | — | — | — | — | — | — | — | — |
| Content (mole %) of the alpha-olefin component | — | — | — | — | — | — | — | — |
| Grafting component | Maleic anhydride | Maleic anhydride | Maleic anhydride | Maleic anhydride | Methyl-esterified product of maleic anhydride | Acrylic acid | Maleic acid | Maleic acid |
| Degree of saponification (mg/g) | 15 | 15 | 15 | 15 | 17 | 55 | 19 | 21 |
| Intrinsic viscosity [η] (dl/g) | 0.93 | 0.93 | 0.93 | 0.97 | 0.91 | 0.90 | 0.92 | 0.08 |
| Chlorine content (wt. %) | 30 | 30 | 30 | 30 | 27 | 30 | 25 | 25 |
| Curable paint | Epoxy-type (*5) | Epoxy-type (*5) | Epoxy-type (*4) | Melamine-alkyd (*6) | Polyurethane-type (*3) | Polyurethane-type (*3) | Polyurethane-type (*3) | Polyurethane-type (*3) |
| Coating composition | | | | | | | | |
| Chlorinated and graft-modified polypropylene (parts by weight) | 5 | 5 | 5 | 5 | 5 | 5 | 5 | 5 |
| Resin for curable paint (parts by weight) | 100 | 100 | 100 | 100 | 100 | 100 | 100 | 100 |
| Substrate | | | | | | | | |
| Type | Phenolic resin | Nylon-12 | Chrome-plated ABS | Chromate-treated steel sheet | Polypropylene (Polypro, J640) | Polypropylene (Polypro, J640) | Filler-reinforced polypropylene (Sunlet TT-7030) | Filler-reinforced polypropylene (Sunlet TT-7030) |
| Method of molding | Pressing | Injection | — | — | Injection | Injection | Injection | Injection |
| Method of degreasing | Wiping with isopropanol | Wiping with isopropanol | Wiping with isopropanol | Wiping with isopropanol | Wiping with white gasoline | Wiping with white gasoline | Wiping with white gasoline | Wiping with white gasoline |
| Properties | | | | | | | | |
| Surface gloss (%) | 96 | 94 | 92 | 91 | 92 | 93 | 94 | 95 |
| Initial compatibility | | | | | | | | |
| Long-term compatibility | | | | | | | | |
| Adhesion | 100/100 | 100/100 | 100/100 | 100/100 | 100/100 | 98/100 | 100/100 | 55/100 |
| Water resistance | 100/100 | 100/100 | 100/100 | 100/100 | 100/100 | 90/100 | 100/100 | 31/100 |

TABLE 1-continued

| Gasoline resistance | X | X |
|---|---|---|

Note to TABLE 1
(*1): The properties other than the chlorine content are those of the modified propylene polymer before chlorination.
(*2): Soflex #1200 (made by Kansai Paint Co., Ltd.)
(*3): Urcol 600 (made by Kawakami Paint Co., Ltd.)
(*4): Elvax 40 (a registered trademark of Mitsui DuPont Chemical Co., Ltd.)
(*5): Mirion No. 1A (made by Kansai Paint Co., Ltd.)
(*6): Aramic No. 3 (made by Kansai Paint Co., Ltd) Polypro J640 and Polypro J440 are products of Mitsui Petrochemical Co., Ltd.

What we claim is:

1. A curable paint, comprising
   (A) 100 parts by weight or a resin for curable paints, and
   (B) 0.5 to 10 parts by weight of chlorinated and graft-modified polypropylene which is produced by chlorinating polypropylene graft-modified with a grafting component selected from the group consisting of maleic acid, maleic anhydride, citraconic acid, citraconic anhydride, fumaric acid and lower alkyl esters of said acids, and which has a chlorine content of 5 to 50% by weight, said graft-modified polypropylene before chlorination having a degree of saponification of 5 to 150 mg/g and an intrinsic viscosity, $\eta$, of 0.4 to 3 dl/g, and said polypropylene before grafting and chlorination containing 85 to 100 mole % of propylene component units.

2. The composition of claim 1, wherein the resin (A) is selected from alkyd resins, unsaturated polyesters, phenolic resins, epoxy resins, urea resins, malamine resins, polyurethane resins and acrylic resins.

3. The composition of claim 1 wherein the chlorinated and graft-modified polypropylene (B) has a chlorine content of 10 to 40% by weight.

4. The composition of claim 1 wherein the graft-modified polypropylene before chlorination has a degree of saponification of 7 to 100 mg/g.

5. The composition of claim 1 wherein the proportion of the chlorinated and graft-modified polypropylene (B) is 1 to 10 parts by weight.

6. A curable paint comprising
   (A) 100 parts of weight of a resin for curable paints,
   (B) 0.5 to 10 parts by weight of chlorinated and graft-modified polypropylene which is produced by chlorinating polypropylene graft-modified with a grafting component selected from the group consisting of maleic acid, maleic anhydride, citraconic acid, citraconic anhydride, fumaric acid and lower alkyl esters of said acids, and which has a chlorine content of 5 to 50% by weight, said graft-modified polypropylene before chlorination having a degree of saponification of 5 to 150 mg/g and an intrinsic viscosity, $\eta$, of 0.4 to 3 dl/g, and said propylene before grafting and chlorination containing 85 to 100 mole % of propylene component units, and
   (C) a diluent.

7. The curable paint according to claim 6, wherein said diluent comprises a solvent selected from the group consisting of aromatic hydrocarbons, aliphatic hydrocarbons, halogenated hydrocarbons, alcohols, ketones, esters, and mixtures thereof.

8. The curable paint according to claim 6, wherein said diluent comprises water.

9. The curable paint according to claim 8, wherein said curable paint is in the form of an aqueous emulsion.

* * * * *

UNITED STATES PATENT AND TRADEMARK OFFICE
CERTIFICATE OF CORRECTION

PATENT NO.  : 4,863,988
DATED       : September 5, 1989
INVENTOR(S) : HAJIME INAGAKI ET AL.

It is certified that error appears in the above-identified patent and that said Letters Patent is hereby corrected as shown below:

On the cover page of the patent, under Related U.S. Application Data, "Mar. 17, 1989" should read --Mar. 17, 1987--.

Claim 6, line 2 of the claim, "of weight" should read --by weight--.

Signed and Sealed this

Thirty-first Day of July, 1990

*Attest:*

HARRY F. MANBECK, JR.

*Attesting Officer*   *Commissioner of Patents and Trademarks*